No. 629,799. Patented Aug. 1, 1899.
D. F. MARSH.
PAN LIFTER.
(Application filed Mar. 17, 1898.)
(No Model.)
Fig. 1.
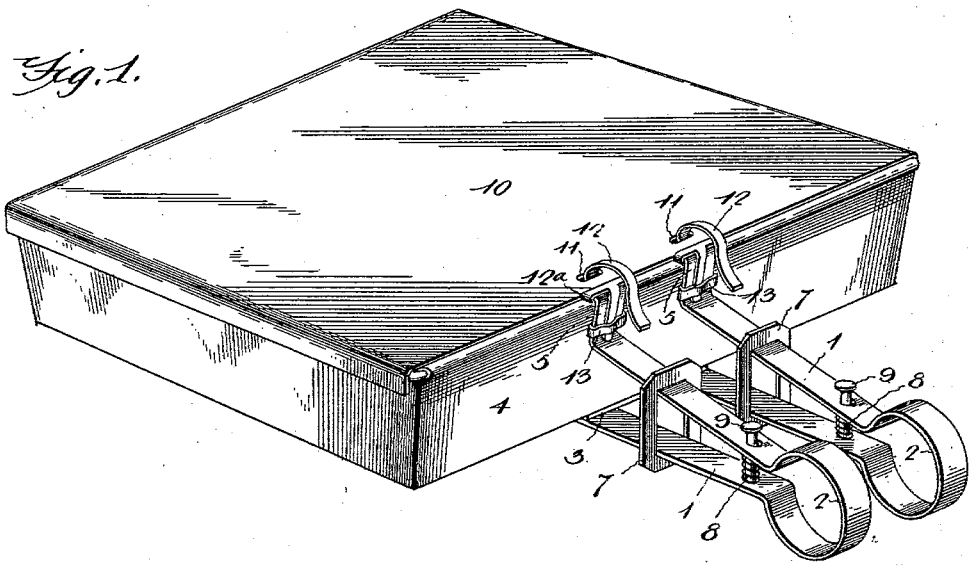
Fig. 2.
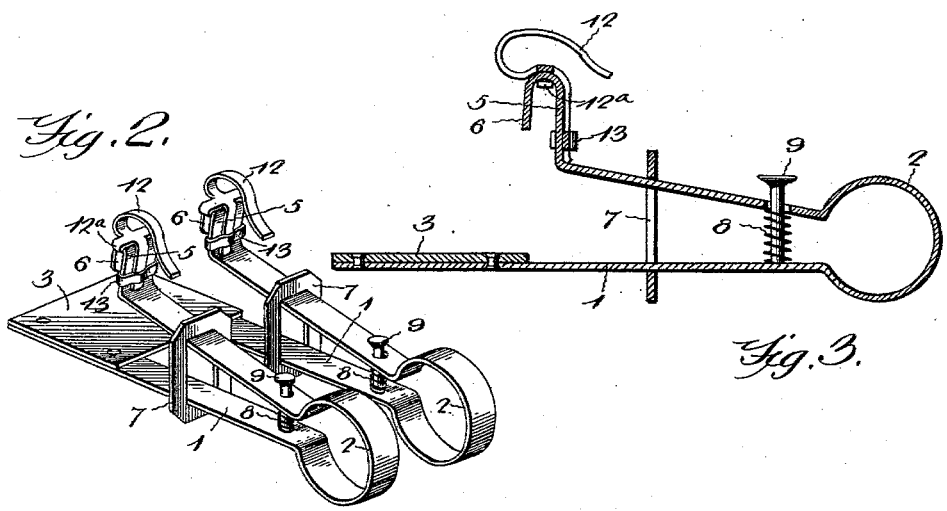
Fig. 3.
Fig. 5.
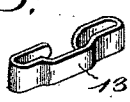
Fig. 4.
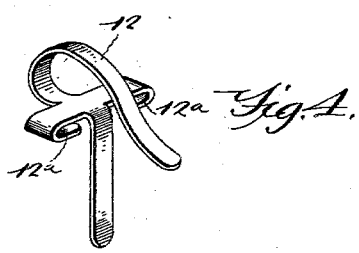
Witnesses
J. Grant Culverwell,
N. F. Riley
Dora F. Marsh, Inventor.
By her Attorneys,
C. A. Snow & Co.
THE NORRIS PETERS CO., PHOTO-LITHO., WASHINGTON, D. C.

UNITED STATES PATENT OFFICE.

DORA FRANCES MARSH, OF NEWPORT, KENTUCKY.

PAN-LIFTER.

SPECIFICATION forming part of Letters Patent No. 629,799, dated August 1, 1899.

Application filed March 17, 1898. Serial No. 674,238. (No model.)

*To all whom it may concern:*

Be it known that I, DORA FRANCES MARSH, a citizen of the United States, residing at Newport, in the county of Campbell and State of Kentucky, have invented a new and useful Pan-Lifter, of which the following is a specification.

The invention relates to improvements in pan-lifters.

The object of the present invention is to improve the construction of pan-lifters and to provide a simple, strong, and efficient device adapted to enable hot pans to be readily lifted from a stove without liability of the hands of the operator coming in contact with a heated surface.

A further object of the invention is to provide a pan-lifter designed especially for handling ash-pans and adapted to furnish a temporary cover for the same and prevent the dust from escaping from a pan.

A further object of the invention is to provide a device adapted to clamp a pan firmly, so that the latter will not leave the device when dumping the ashes into a barrel or other receptacle.

The invention consists in the construction and novel combination and arrangement of parts, as hereinafter fully described, illustrated in the accompanying drawings, and pointed out in the claims hereto appended.

In the drawings, Figure 1 is a perspective view of a pan-lifter constructed in accordance with this invention and shown applied to a pan. Fig. 2 is a similar view, the device being detached. Fig. 3 is a longitudinal sectional view, the parts being arranged as shown in Fig. 1. Fig. 4 is a detail perspective view of one of the hooks. Fig. 5 is a similar view of one of the clips.

Like numerals of reference designate corresponding parts in all the figures of the drawings.

1 1 designate a pair of parallel clamps, each constructed of a piece of resilient metal and composed of upper and lower sides, connected at the outer end of the clamp by a circular spring-bend 2, which forms a convenient handle adapted to be readily grasped by the operator. The lower arms, which are straight and horizontal, are connected by a transversely-disposed pan-supporting portion or plate 3, which is adapted to extend beneath the bottom of a pan 4 and support the same, and the said plate 3 may be composed of extensible sections slidingly connected with each other and adapted to enable the device to be varied in width to suit pans of different sizes.

The upper sides of the clamps are provided with jaws 5, adapted to engage the upper edge of the outer side of a pan, and being substantially U-shaped and having the leg 6, which extends into the pan, shorter than the other leg, which is connected to the upper side of the clamp. Each clamp is preferably constructed of a single piece of resilient material bent, as shown, to form the upper and lower sides, the spring-loop, and the jaw.

The spring loop or bend 2 is adapted to separate the sides and elevate the jaw, so that it will be in position for clamping the upper edge of a pan, and it is retained in engagement with the same by a sliding ring 7, preferably rectangular to conform to the configuration of the sides of the clamp and adapted to be moved toward the jaw for causing the latter to engage the pan firmly.

The device is adjustable to suit pans of different sizes, the jaws being brought more or less closer to the supporting-plate by the sliding ring or loop to correspond to the height of the sides of the pan. The spring-bends serve to elevate the upper sides of the clamps, and in order to assist the bends and prevent the same from losing their resiliency coiled springs 8 are employed and are interposed between the upper and lower sides of the clamps. The coiled springs 8 are supported on pins 9, secured at their lower ends to the lower sides of the clamps and extending through perforations of the upper sides of the same.

The pan-lifter is provided with a hinged cover 10, adapted to serve as a temporary cover for a pan and provided with eyes or openings 11, which are linked into open eyes or hooks 12, arranged at the tops of the jaws of the clamps and detachably connecting the cover to the same. The cover, which may be provided with adjustable sections to correspond with the sections of the supporting-plate, has a depending flange at its outer edge in order to cover a pan more effectually.

The shank of the hook or open eye is provided at opposite sides with arms 12ª, which engage the side edges of the jaw and are bent against the inner face of the same. The arms are located at the top of the jaw, and the lower end of the shank is secured by a clip 13, embracing the jaw and having a central offset or bend to receive the shank.

The invention has the following advantages: The pan-lifter, which is simple and comparatively inexpensive in construction, forms an effective device for carrying hot pans, and it is especially adapted for handling ash-pans, as it provides a temporary cover for the same, so that dust will not escape from a pan while carrying the same. The device is also adapted to grip a pan firmly, and in dumping ashes into a barrel or other receptacle it does not release the pan. By providing a pair of clamps a pan or similar receptacle may be carried without liability of spilling any of its contents, and a steady support for a pan is provided.

Changes in the form, proportion, and minor details of construction may be resorted to without departing from the spirit or sacrificing any of the advantages of this invention.

What I claim is—

1. A device of the class described comprising a clamp provided at its bottom with a pan-supporting portion and having a hook extending downward from its upper portion to engage the upper edge of a pan, a reversely-disposed hook mounted on the upper portion of the clamp and forming an eye, and a cover detachably hinged to the eye and adapted to form a lid for the vessel arranged on the pan-supporting portion, and capable of being applied to different pans, substantially as described.

2. In a pan-lifter, the combination of a pair of clamps having upper and lower jaws, a pan-supporting portion connecting the lower jaws of the clamps, a cover supported at different points by the clamps, and means for detachably hinging the cover to the upper jaws of the said clamp, substantially as described.

3. A device of the class described comprising a pair of clamps having a lower pan-receiving portion and provided with upper jaws, arranged to engage the upper edge of a pan, the hooks extending in the opposite direction from the jaws, and a cover supported at different points by the clamps and detachably hinged to the same by the said hooks and adapted to form a lid for different pans, substantially as described.

4. A pan-lifter comprising clamps having a lower pan-supporting portion, and provided with upper jaws for engaging the upper edge of a pan, and hooks detachably mounted on the jaws, extending rearward and adapted to hinge a cover to the pan-lifter, substantially as described.

5. A device of the class described comprising a clamp having a lower pan-receiving portion and provided with an upper jaw adapted to engage the upper edge of a pan, a hook extending in the opposite direction from the jaw and provided with arms engaging the same, a fastening device securing the shank of the hook to the clamp, and a cover detachably engaging the hook and hinged to the clamp by the same, substantially as described.

6. A device of the class described comprising clamps provided with U-shaped jaws for engaging the upper edge of a pan, hooks having shanks and provided with arms engaging the jaws at the tops thereof, and clips embracing the jaws and the shanks and provided with bends or offsets to receive the latter, substantially as described.

In testimony that I claim the foregoing as my own I have hereto affixed my signature in the presence of two witnesses.

DORA FRANCES MARSH.

Witnesses:
 JOSEPH C. WOOD,
 M. J. BROWN.